United States Patent [19]

Pahler

[11] 4,377,233
[45] Mar. 22, 1983

[54] RECORD AND TAPE STORAGE UNIT

[76] Inventor: William J. Pahler, 91 Gilligan St., Wilkes Barre, Pa. 18702

[21] Appl. No.: 308,843

[22] Filed: Oct. 5, 1981

[51] Int. Cl.³ .................. B65D 85/30; B65D 85/57
[52] U.S. Cl. .............................. 206/310; 206/387; 206/391
[58] Field of Search ............ 206/508, 387, 391, 486, 206/310; 211/40

[56] References Cited

U.S. PATENT DOCUMENTS

| | | | |
|---|---|---|---|
| 1,320,958 | 11/1919 | Albrecht et al. | 206/310 |
| 2,379,680 | 7/1945 | Burdick | 206/508 |
| 2,564,834 | 8/1951 | Devine et al. | 206/508 |
| 3,530,981 | 9/1970 | Wienecke, Jr. | 206/310 |
| 4,180,299 | 12/1979 | Tolerson | 206/387 |

FOREIGN PATENT DOCUMENTS

| | | | |
|---|---|---|---|
| 2100464 | 7/1972 | Fed. Rep. of Germany | 206/387 |
| 2801567 | 7/1979 | Fed. Rep. of Germany | 206/387 |
| 1302397 | 1/1973 | United Kingdom | 206/387 |

Primary Examiner—Joseph Man-Fu Moy
Attorney, Agent, or Firm—Anthony J. Dixon

[57] ABSTRACT

A portable 45 R.P.M. and magnetic tape cassette storage and carrying case wherein interchangeable advantages within the case allow for storage of records, tapes or a combination of both. Means for storing one case upon another are also provided along with means for carrying the case.

2 Claims, 10 Drawing Figures

RECORD AND TAPE STORAGE UNIT

BACKGROUND OF THE INVENTION

The present invention relates to a convertible storage case for records and magnetic tape cassettes and eight-track magnetic tape cartridges either exclusively or in combination.

The primary object of the invention is to provide a storage case which can accomodate records in a stacked manner or tape cartridges of two sizes in a stacked manner or in combination of tape cartridges and record with a simple conversion of the various interacting parts of the storage case.

THE PRIOR ART

Numerous storage devices are known which are intended to receive eight-track tape cartridges or cassettes or records which are adapted to receive one or the other of these devices. This has resulted in numberous storage devices, one for each type of item which has in turn resulted in unnecessary inconvenience and expense.

Cases for records can be seen as disclosed by Atkins in U.S. Pat. No. 3,100,671 and Soragg in U.S. Pat. No. 4,108,511. Holders for different size magnetic tapes are disclosed by Berkmanin U.S. Pat. No. 4,117,931. Yet none of these devices combines the efficiency of a case which is convertible from one use to another.

Accordingly, it is the object of the present invention to provide a storage unit which is convertible to store either 45 R.P.M. records, eight-track tape cartridges or tape cassettes to overcome the disadvantage of needing three different types of cases.

It is another object of the present invention to provide a case of this convertible nature which is simple in construction and economical to manufacture.

It is a further object of the present invention to provide a storage case with interchangeable parts to accomodate all three types of items, namely 45 R.P.M. records, eight-track cartridges and tape cassettes, either together or singly.

It is still a further object of this invention to provide a storage case which can accomodate varying amounts of all three types of items, namely, 45 R.P.M. records, eight-track tape cartridges and tapes cassettes.

Accordingly, to achieve the above objects as well as others which will become readily apparent hereafter, a convertible storage use embodying spaces for the three types of items is disclosed.

In general, the present storage case consists of a generally rectangular base having two circular depressions in the top surface thereof and a rectangular depression in the bottom surface thereof; two record spindles, each having a circular flat base and a perpendicular shaft of cylindrical configuration; at lease one rectangular box-shaped container with an open top and a circular ridge in the bottom surface thereof; at least one rectangular box-shaped container with a flat bottom surface and four legs extending vertically from the bottom corners thereof and a cover which is rectangular with an open bottom and a rectangular projection on the top surface thereof, accomodatingly smaller than the rectangular depressions in the bottom of the base.

These elements cooperate in the following fashion: Each record spindle can be set into the base circular depressions in that the circular base of each spindle is accomodatingly smaller than the circular depressions in the rectangular base.

The rectangular box-shaped containers are of a height less than half the height of the cover so that the box-like container with the circular ridge on the bottom thereof can also be placed on the base in that this ridge is accomodatingly smaller than the circular depressions in the base.

The rectangular box-shaped containers have legs at least as long as the box-like container above as high and are of the same size in the box portion as the base box is. In this way, each base box set on the base can be covered by one of these legged-boxes to increase storage space, wihout the weight of the legged box being supported by the items contained in the base box. The height of any two boxes stacked one on top of the other is less than the height of the cover.

The cover fits over the base in the normal fashion and the rectangular projection is accomodatingly smaller than the rectangular depression in the base to allow stacking of one completed unit onto another.

By using two spindles, the unit will accomodate 45 R.P.M. records. By using one spindle, one base-box and one leg-box, the unit will accomodate 45 R.P.M. records, cassettes and eight-track cartridges. By using two base-boxes and two leg-boxes, the unit will accomodate eight-track cartridges and casettes in varying proportions to suit the user.

The width of the base is accomodatingly wider than the diameter of a 45 R.P.M. record and the length is accomodatingly larger than twice said diameters. The height of the cover is large enough to accomodate two boxes stacked, each box high enough to accomodate eight-track cartridges stacked lengthwise or cassettes stacked lengthwise.

The entire completed storage unit can be further improved by construction the cover of transparent material so as to view the contents without opening case. Further means for attaching a strap handle can also be added.

Additional objects, features and advantages of the present invention will appear from the following description in which the preferred embodiment has been set forth in detail in conjunction with the accompanying drawings.

DESCRIPTION OF DRAWINGS AND THE PREFERRED EMBODIMENT

The present invention can best be understood by a step by step description of the interaction of the various parts with reference to the drawings.

Figure 1:
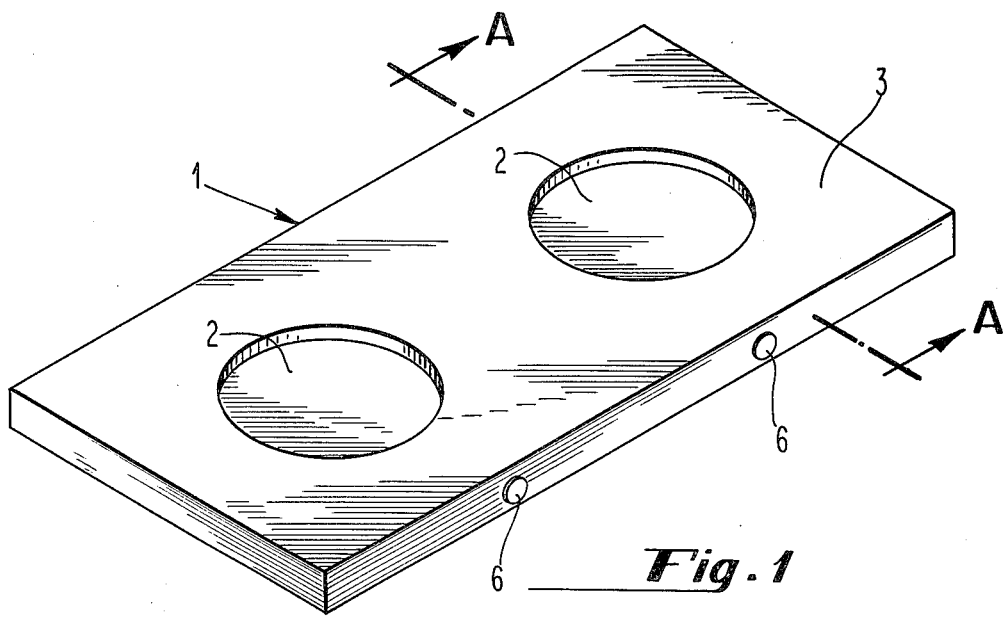
FIG. 1 is a top view of the base of the invention.
Figure 2:
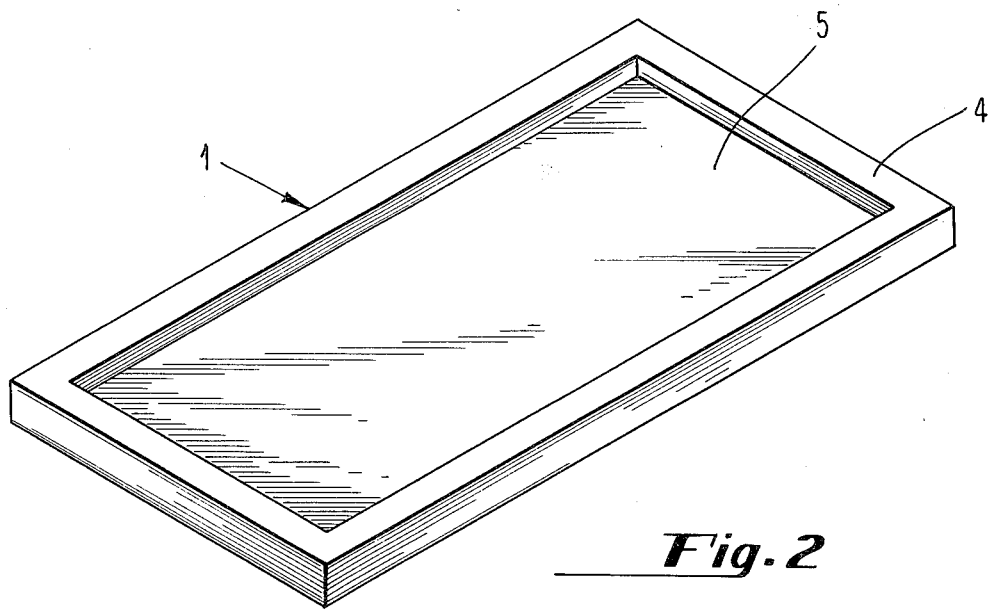
FIG. 2 is a bottom view of the base of the invention.

FIG. 1 shows the base or bottom of the storage device. The base is generally rectangular in nature and base a top surface 3 and a bottom surface, 4, as shown on FIG. 2. The upper surface has two circular depressions, 2, indentations into it, each to accomodate either spindle base 11, FIG. 4, or base-box 20, FIG. 5.

The bottom surface, 4, is constructed so that a rectangular indentation 5, is positioned in the plane of said surface 4. Said indentation is accomodatingly larger than the rectangular projection 42 on the cover top.

Figure 3:
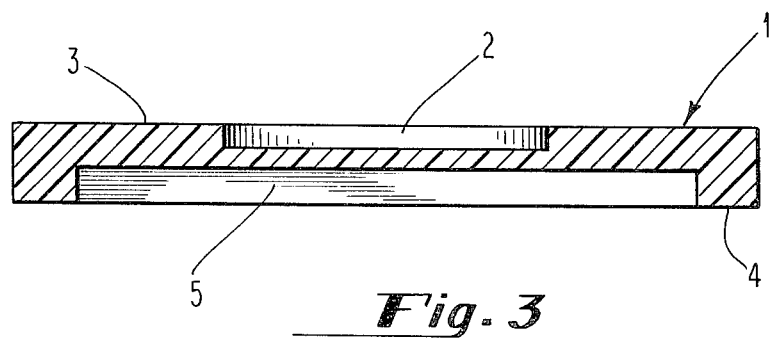
FIG. 3 is a sectional view of the base along line A—A of FIG. 1.

FIG. 3 shows a cross-sectional view of base 1 along line A—A and the rectangular indentation can be readily viewed.

Figure 4:
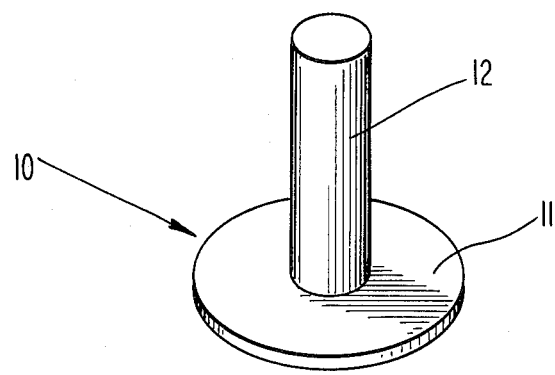
FIG. 4 is a frontal view of the spindle and base.

In order to accomodate 45 R.P.M. records, spindle 10 is provided as shown on FIG. 4. The spindle has a flat, circular base 11 which is accomodatingly smaller than base indentation 2 and of a thickness of at lease about the depth of indentation 2. A perpendicularly, fixedly mounted shaft 12 is provided which is of a cylindrical shape with a diameter accomodatingly smaller than the aperture in a 45 R.P.M. record or less than about 1⅝ inches. By placing two spindles, 10 or the base 1, two stacks of records can be accomodated. In the preferred embodiment, the shaft is at least about nine inches high and each can accomodate at least one hundred twelve records. Naturally, the base must be of a width larger than the diameter of a record and of a length larger than twice the diameter of a 45 R.P.M. record.

Figure 5:
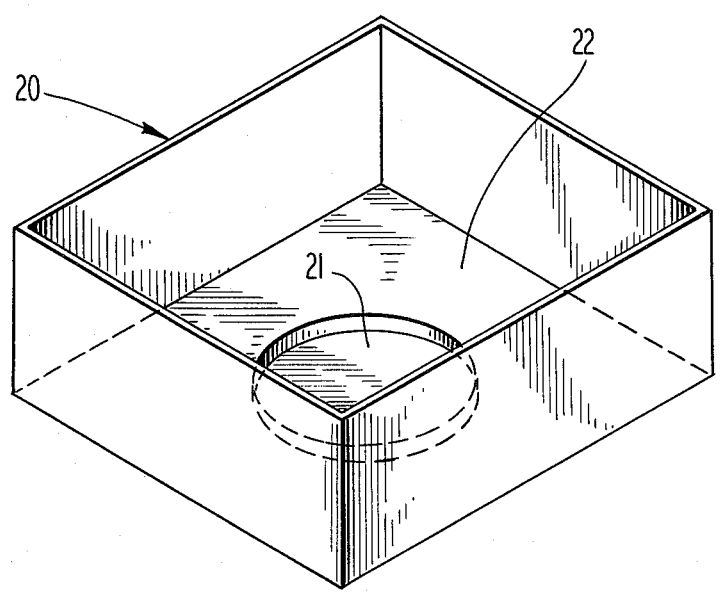
FIG. 5 is an isometric view of the base box.

FIG. 5 shows basebox 20 which is an open-topped rectangular box-like container which has a circular projection 21 integrally formed in the bottom surface thereof. The projection 21 is accomodatingly smaller than depression 2 in base 1 so that the base-box 20 can be slidingly placed on the base 1 and the cooperation of indentation 2 and projection 21 will prevent sliding motion of base-box 22 along the upper surface of base 1.

At least one base box is required in the assembled unit to accomodate tape cassettes or cartridges.

Figure 6:
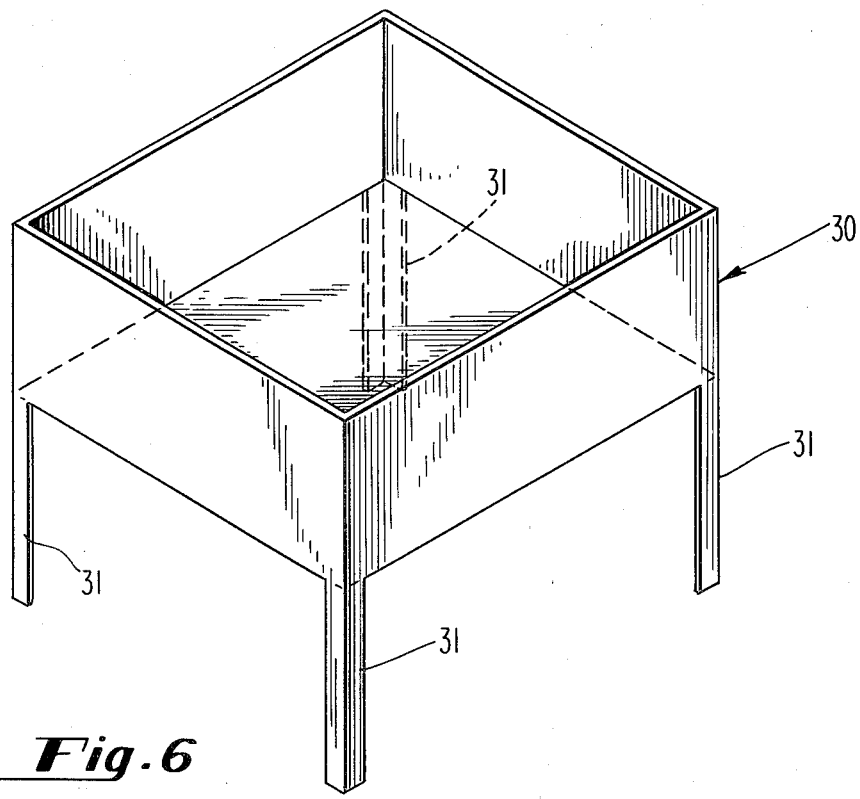
FIG. 6 is an isometric view of the legged box.

FIG. 6 depicts legged-box 30 which is an open-topped rectangular box-type structure mounted on four legs 31.

If only tape cassettes and eight-track cartridges are to be stored, the elements cooperate as follows: two base boxes are placed on the base. Two legged boxes are then set over these base boxes. In this way, four individual containers are provided and each can be removed without disturbing the others. The cross sectional area of the base boxes is somewhat smaller than the top boxes to allow the legs 31 to span the base box. Each leg is angle shaped so as to slidingly move over the corners of the base box.

Figure 8:
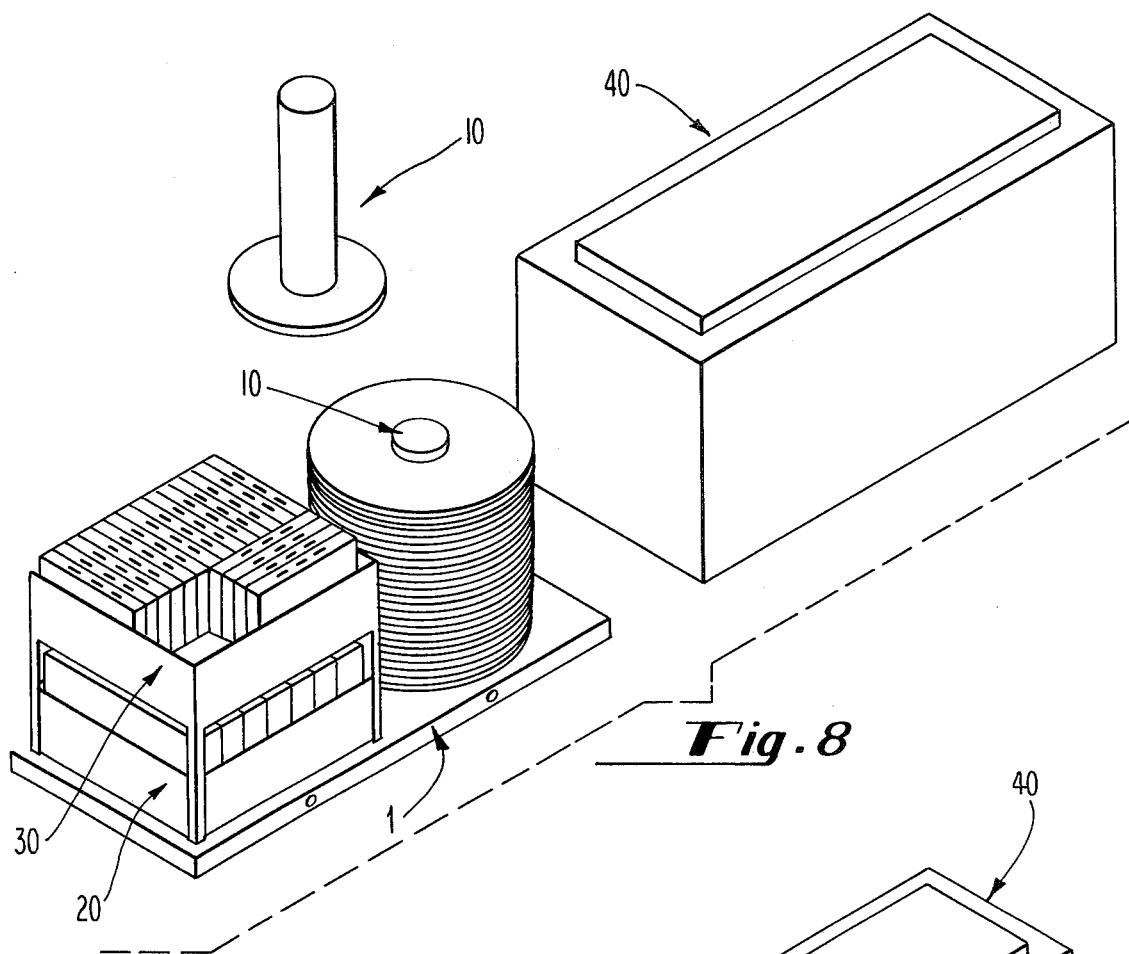
FIG. 8 is (photo 1).

If records and tapes are to be stored together, one box indentation 2 is used to accomodate a spindle 10 and one is used to accomodate a base-box 20 covered by a legged box 30, as shown on FIG. 8.

Figure 7:
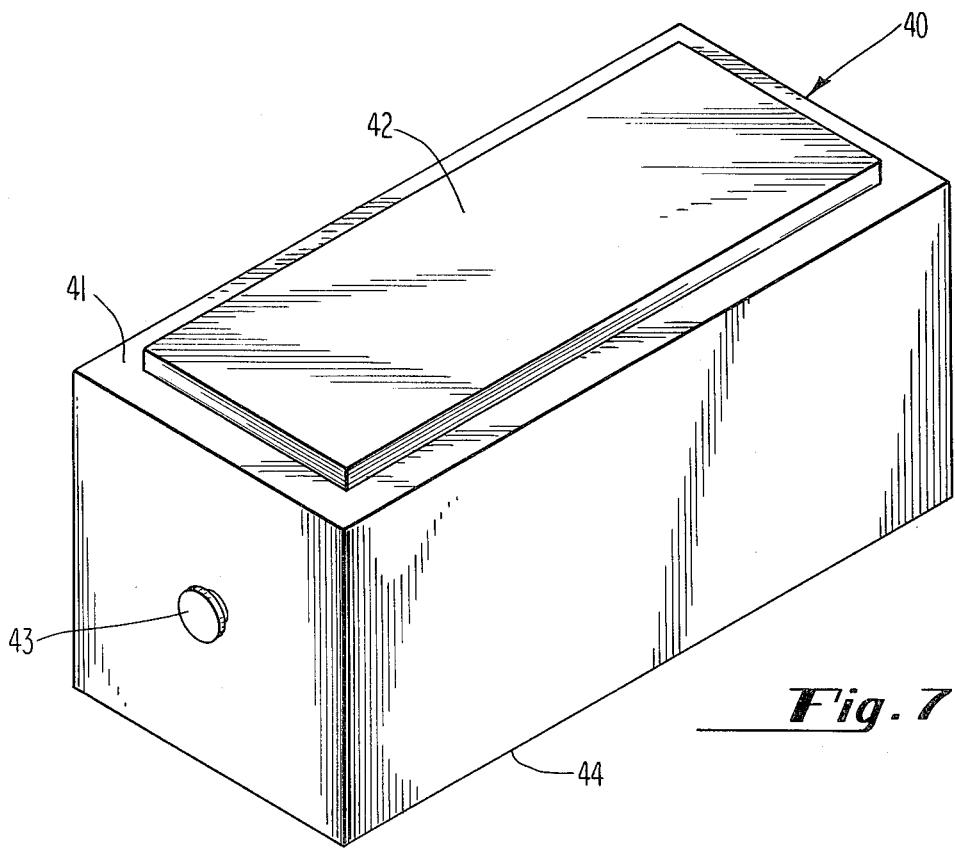
FIG. 7 is an isometric view of the cover.

The cover 40 is shown on FIG. 7 and consists of a boxlike, open-bottomed, rectangular structure. This cover is placed over base 1 and the lower edge of the cover 44, sits on the top surface of the base 3. The cover is accomodatingly large enough to cover either the double spindle configuration or a combination spindle-box configuration.

The top projection 42 is sized to be accomodated by the rectangular indentation 5 in base 1 so as to allow one completed storage device to be stacked on another without side to side movement. In this fashion, a number of units can be stacked, one on the other.

Figures 9, 10:
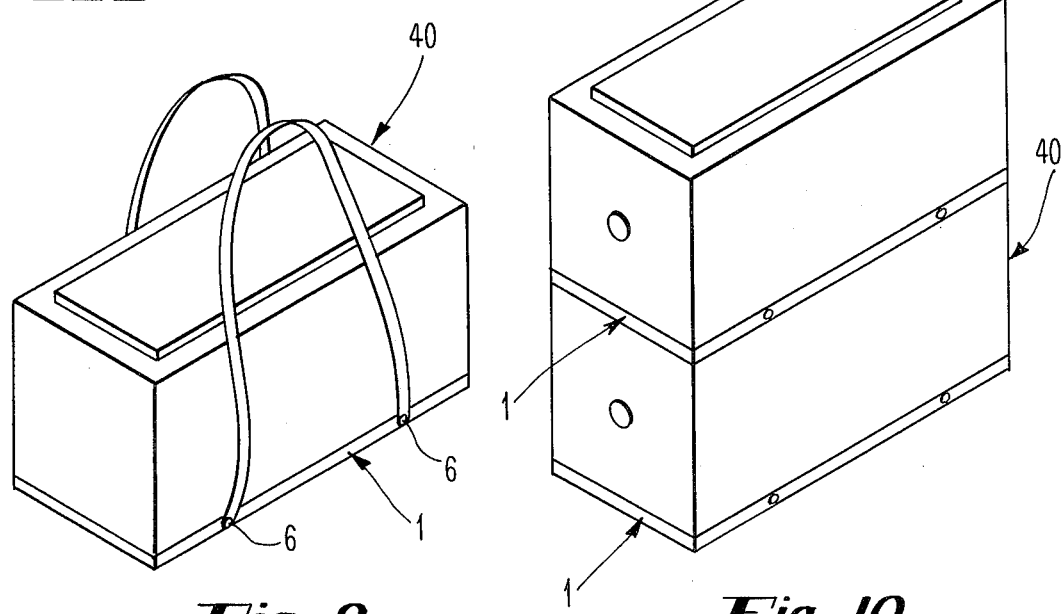
FIG. 9 is (photo 2).
FIG. 10 is (photo 3).

Handle fasteners 6 (only 2 shown) are placed on both edges of the base 1 whereby straps of fabric such as canvas or leather can be attached and grasped together over the top of the cover as shown on FIG. 9 so as to keep the cover in place while the unit is being transported.

The entire structure can be made of a plastic material such as polypropylene which is rigid enough to handle the material weight and yet transparential so as to allow the user to view the items contained therein.

Although the present invention has been described in same detail by way of illustration and example for purposes of explanation, it will, of course, be understood that various changes and modifications may be made without departing from the scope of the invention as claimed herein.

I claim:

1. A record and magnetic tape cassette storage and carrying case comprising
   a. a generally rectangular base with a top surface and a bottom surface;
   b. two circular depressions in the top surface with a diameter accomodatingly larger than the diameter of a forty-five R.P.M. record;
   c. a rectangular depression in the bottom surface thereof;
   d. at least one single shaft record spindle, each comprising a circular flat base of a diameter accomodatingly smaller than the circular depressions of (b) above and a single perpendicular shaft of cylindrical configuration;
   e. at least one first rectangular box-shaped container with an open top and a closed bottom and further comprised of a circular ridge in the bottom thereof;
   f. at least one second rectangular box-shaped container with a flat bottom surface and four vertical legs of a length at least as long as the height of the container;
   g. a box-shaped cover of rectangular configuration comprised of an open bottom and a top surface further comprising a rectangular projection on said top surface accomodatingly smaller than the rectangular depression in the base; and
   h. two strap-type carrying handles attached at each end to said base and disposed over the cover to be grasped by the user, and when said cover further comprises two knob-type handles to allow easy removal and placement of the cover relative to the base; and whereby at least one record spindle can be placed on the base to receive records thereon; at least one first container can be placed on the base to receive cassettes; at least one second container can be placed over the first container to receive cassettes; the cover can be placed over the selected combination of spindles and boxes to complete the case and whereby one complete case can be stacked on another by co-operation of the cover projection of one case and the base depression in a second case.

2. The record and magnetic tape cassette storage and carrying case of claim 1 further comprising two single shaft record spindles.

* * * * *